Figure 1:
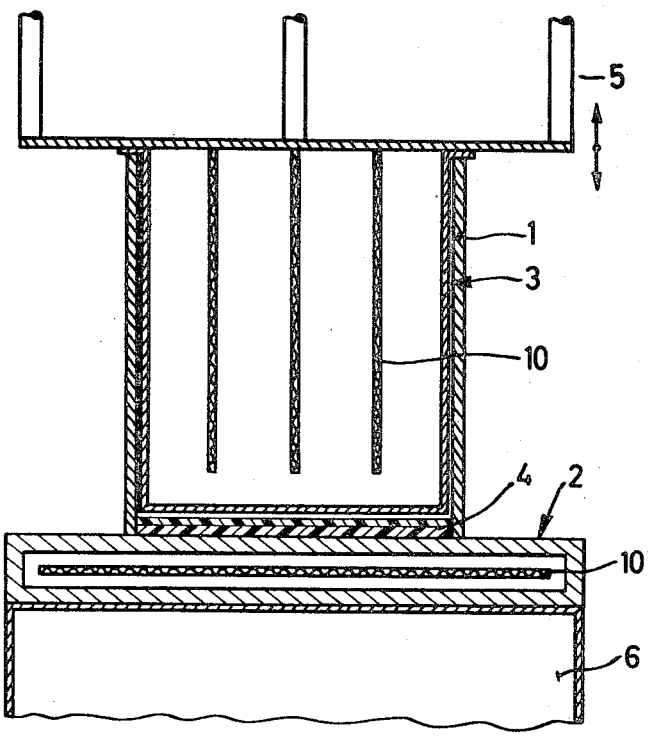

United States Patent
Stastny et al.

[11] 3,818,086
[45] June 18, 1974

[54] PRODUCTION OF EXPANDED ETHYLENE POLYMERS

[75] Inventors: Fritz Stastny, Ludwigshafen; Rudolf Gaeth, Limburgerhof; Boris Ikert, Mannheim, all of Germany

[73] Assignee: Badische Anilin- & Soda-Fabrik Aktiengesellschaft, Ludwigshafen, Germany

[22] Filed: Apr. 17, 1970

[21] Appl. No.: 29,515

[30] Foreign Application Priority Data
Apr. 18, 1969 Germany.......................... 1919748

[52] U.S. Cl................ 264/55, 260/2.5 HA, 264/45, 264/54, 264/DIG. 5, 264/DIG. 13, 264/DIG. 17, 264/DIG. 18
[51] Int. Cl.......................... B29c 3/00, B29d 27/00
[58] Field of Search........... 264/54, 55, 51, 313, 45, 264/DIG. 5, DIG. 13, DIG. 17, DIG. 18; 260/2.5 HA

[56] References Cited
UNITED STATES PATENTS

| | | | |
|---|---|---|---|
| 2,763,897 | 9/1956 | Gates | 264/55 |
| 2,768,407 | 10/1956 | Lindemann | 264/55 X |
| 3,007,209 | 11/1961 | Roberts | 264/45 |
| 3,098,831 | 7/1963 | Carr | 264/54 X |
| 3,098,832 | 7/1963 | Pooley | 264/54 X |
| 3,211,605 | 10/1965 | Spaak | 264/45 X |
| 3,250,730 | 5/1966 | Palmer | 264/54 X |
| 3,341,480 | 9/1967 | Feild | 264/54 X |
| 3,341,481 | 9/1967 | Palmer | 264/54 X |
| 3,389,198 | 6/1968 | Taber | 264/54 X |
| 3,470,119 | 9/1969 | Benning | 264/54 X |

*Primary Examiner*—Philip E. Anderson
*Attorney, Agent, or Firm*—Johnston, Root, O'Keeffe, Keil, Thompson and Shurtleff

[57] ABSTRACT

Production of flexible expanded moldings from olefin polymers by heating a mixture comprising an olefin polymer, a peroxide and a solid expanding agent in a mold, which is gastight when closed and is filled with a volume of said mixture equal to from 95% to 100% of its capacity, to a temperature above the softening point of the olefin polymer and above the decomposition temperature of the peroxide and of the expanding agent, starting to release the pressure in the mold to atmospheric pressure, immediately increasing the volume of the mold to from 3 to 35 times the volume of the expansible melt within from 0.1 to 20 seconds and then cooling the expanded molding. The moldings are used as thermal and sound insulating materials and as upholstery padding.

5 Claims, 4 Drawing Figures

INVENTORS:
FRITZ STASTNY
RUDOLF GAETH
BORIS IKERT

BY JOHNSTON, ROOT, O'KEEFFE, KEIL, THOMPSON & SHURTLEFF

PRODUCTION OF EXPANDED ETHYLENE POLYMERS

This invention relates to a process for the production of expanded materials and expanded moldings in which ethylene polymers, which contain an expanding agent and a cross-linking agent, are heated and expanded in molds.

In the prior art methods commonly employed for the manufacture of expanded ethylene polymers the expanding agents used are gas-liberating substances which are mixed with the ethylene polymers at a temperature below that at which the gas-liberating agents decompose. The ethylene polymers may contain cross-linking agents in addition to the expanding agent. The mixture is then placed in a mold, which is gastight and pressure-resistant when closed, and is then heated at a temperature at which the expanding agents decompose. In this way expandable moldings are produced in which the gases resulting from the decomposition of the expanding agent are dissolved. The mixture must then be cooled whilst maintaining the applied pressure. There are thus produced expansible moldings which may be expanded by heating at moderately elevated temperatures, for example at 130°C for 30 minutes. The resulting expanded materials have very fine cells.

A big drawback in this method, which is frequently referred to as high-pressure compression molding, is that the expandable molding must be made in a gastight mold at from 170° to 200°C and then cooled in the mold to ensure that the gases liberated by the expanding agent remain dissolved in the molding. Thus the mixtures of ethylene polymer and expanding agent placed in a mold must be periodically heated and cooled. Consequently, this method takes a relatively long time.

German Printed application No. 1,208,488 discloses a method of making cross-linked expanded olefin polymers in which the cross-linking agents used are peroxides having a decomposition temperature which is higher than that of the expanding agent. Since, in this case, expansion is carried out at a temperature below the decomposition temperature of the cross-linking agent, the expanding and cross-linking operations proceed substantially separately. There is first obtained an expanded material having a very narrow melting range which is then cross-linked by heating to a higher temperature. A disadvantage of this method is that the expanded materials generally shrink upon cross-linking.

It is therefore the object of the invention to provide a process in which expanded ethylene polymers may be made in a mold in a simple manner, while avoiding the aforementioned drawbacks of the prior art processes, such as cooling the expandable molding in a closed gastight mold or expanding the pre-expanded material in a separate operation.

We have now found that the said object can be achieved by using expanding agents with decomposition temperatures which are higher than those of the peroxides used as cross-linking agents, heating the ethylene polymer in a mold, which is gastight when closed and which initially exhibits practically no gas space when filled, to temperatures above the softening range of the ethylene polymers and above the decomposition temperatures of the expanding agent and cross-linking agent, starting to release the pressure in the mold to atmospheric pressure, immediately increasing the volume of the mold to from 3 to 35 times the volume of the expansible melt contained in the mold and allowing the expanded material to cool in the mold.

By ethylene polymers we mean crystalline polymers having an X-ray crystallinity of more than 25% at 25°C. Suitable ethylene polymers for the process are homopolymers of ethylene and copolymers containing at least 50% by weight of polymerized units of ethylene. Suitable copolymers are those of ethylene with other olefins, such as propylene or n-butene, or with other ethylenically unsaturated monomers. Other suitable copolymers are those of ethylene with from 5 to 30 percent by weight of esters of acrylic or methacrylic acid derived from alcohols containing from one to 8 carbon atoms, or vinyl carboxylic esters of carboxylic acids containing from two to four carbon atoms, as well as copolymers obtained by copolymerizing ethylene with t-butyl or isopropyl esters of acrylic or methacrylic acid. The conditions used in making the said polymers are so selected that part of the polymerized units of acrylic acid ester leads, for example in the case of t-butyl acrylate, to the formation of free acid groups in the structure with the elimination of isobutylene. The ethylene copolymers then contain from 0.1 to 7 mole%, preferably from 0.2 to 5 mole% of polymerized units of carboxylic acid groups. Also suitable are chlorinated ethylene polymers containing about 15–45% by weight of chlorine.

Particularly suitable cross-linking agents are organic peroxides. However, only those peroxides are selected which cause no or only very slight cross-linking of the ethylene polymer at the temperature used for mixing the ethylene polymers with the expanding agents and cross-linking agents. Especially suitable agents are, therefore, products which cause cross-linking at relatively high temperatures, preferably at temperatures which are from 10° to 80°C higher than the softening range of the polymers. Examples are 1,3-bis-(t-butyl-peroxy-isopropyl)-benzene, dicumyl peroxide and t-butylcumyl peroxide. In general, from 0.05 to 2.5%, preferably from 0.1 to 1.5%, by weight of cross-linking agent is used, based on the polymer.

We have found chemical expanding agents to be the most suitable. These are predominantly solid compounds which on heating decompose with the formation of gaseous decomposition products or which give off gases. Advantageously, expanding agents are selected whose decomposition temperatures are from 15° to 150°C above the softening range of the ethylene polymer. The decomposition on temperature of the expanding agent is advantageously from 5° to 70°C above that of cross-linking agent.

By the softening range of ethylene polymers we mean the crystalline melting point or softening point of a polymer, the lower limit of the softening range being taken as reference temperature.

Suitable expanding agents which may be used in the process of the invention are for example: azodicarbonamide, p-carbomethoxy-N-nitroso-N-methylbenzamide, azoisobutyronitrile, N,N'-dinitroso-pentamethylene tetramine, N-nitroso-N-alkylamides of aromatic dicarboxylic acids, trans-N,N'-dinitroso-N,N'-dimethylhexahydroterephthalamide, N,N'-dinitroso-N,N'-dimethylterephthalamide and N,N'- dimethyl-N,N'-dinitrosoterephthalamide and diphenyl sulfone 3,3'-disulfohydrazide.

The expanding agents are contained in the particles in amounts of from 2 to 25%, advantageously from 5 to 15%, by weight of the polymer.

In the production of the expansible particles there may be used a wide variety of additives, such as dyes, fillers, lubricants, pigments, flame retardants, fibers, e.g., glass fibers, insert fillers, expandable clay particles and polymers, such as isobutylene.

The ethylene polymers, cross-linking agents, expanding agents and any additives are homogenized in mixing units such as are commonly used in the plastics industry. The mixtures prepared for further processing expanded materials may be in the form of sheeting of from 1 to 10 mm in thickness such as is obtained on removal from calenders or roll mills. Alternatively, mixtures may be used which are in the form of granules, strands irregularly shaped particles or compressed sheets. In preparing the mixtures, it is essential in every case that the ethylene polymers should sufficiently softened to ensure thorough and intimate mixing. This mixing operation is carried out at as low a temperature as possible to ensure that no or only very slight decomposition of the cross-linking agent takes place. Since the decomposition temperature of the expanding agent used in the process of the invention is higher than that of the peroxide used, no gas is given off by the expanding agent during the mixing operation. The mixtures may be prepared particularly efficiently in an extruder because they can be very easily obtained in the form of granules. The components are generally mixed at temperatures ranging from 100° to 120°C.

It is of decisive importance to ensure that the mixtures are heated in molds which are gastight when closed and that the molds are filled with expansible material to such an extent that there is practically no gas space in the mold when hermetically closed, i.e., the cavity of the mold is as a rule filled with ethylene polymer mixture to the extent of from 95 to 100% of its volume. This ensures that the gas liberated by the expanding agent is almost entirely dissolved in the melt. The molds are heated in a press, and then the pressure of the ram of the press is removed after the expansible composition has been heated, the gastight seal is broken. The ram of the press is then adjusted to the desired level in the mold within a period ranging from a fraction of a second, e.g., one tenth of a second, to 20 seconds, so that the expansible composition can expand.

FIG. 1 illustrates the principle of operation of such a mold. The mold consists of a loose baseplate 2 on which side walls 1, which are rigidly connected to each other, are mounted. Into the cavity formed by the baseplate 2 and side walls 1 there can be introduced a heatable ram 3 down to the level of the charge of expansible ethylene polymer mixture 4. The mold is then hermetically closed and contains virtually no gas space. The ram 3 is secured to the upper portion 5 of the press. The heated baseplate 2 rests on the lower portion 6 of the press. When the ram 3 is raised, the gastight seal is broken. By raising the ram 3 the volume of the mold cavity is increased to from 3 to 35 times the volume of the expansible melt. The cavity of the mold may have a complex shape, for example that of an animal, a lifebelt, a cylindrical shaped article or part of a package with projections.

To carry out the process, the homogeneous mixture of ethylene polymer, cross-linking agent and expanding agent is introduced into the cavity of the mold to a depth of up to about 5 cm. The heatable ram 3 is then introduced into the mold by lowering the upper portion 5 of the press so that virtually no air space is left between the mixture, stacked sheets or granules 4 and the ram 3. The ram is lowered until the mold is closed in a gastight manner. The mixture is then heated by electrical heating means 10 to a temperature which is above the decomposition temperature of the cross-linking agent and above the decomposition temperature of the expanding agent. The temperature required depends on the composition of the ethylene polymer. It is generally between 160° and 220°C. preferably between 170° and 195°C. When the sheets or granules have been sufficiently heated, from 40 to 90 seconds being generally necessary for each millimeter of height of the charge, the pressure in the mold is released to atmospheric pressure by removing the pressure of the arm 3 from the mold and the ram is raised so as to increase the volume of the mold cavity by a multiple. The rate at which the volume is increased depends on the desired density of the finished foam. The volume of the mold cavity is enlarged by from 3 to 35 times, preferably by from 10 to 30 times, the volume of the expansible melt which then fills out the thus enlarged cavity of the mold. The mold may then be removed from the hot press and cooled to room temperature, if desired by additional cooling, for example by means of an air stream.

Figure 2:
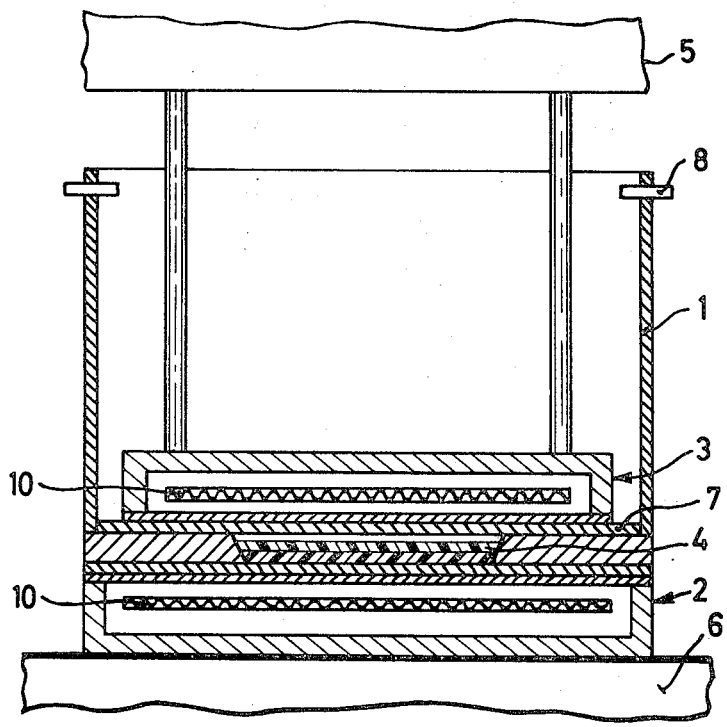
Figure 3:
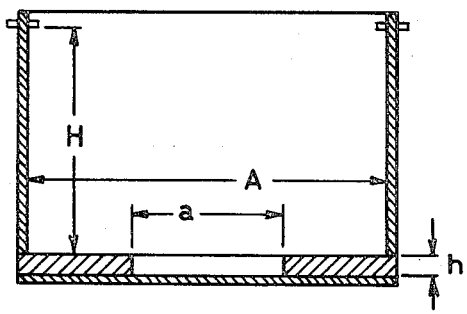
Figure 4:
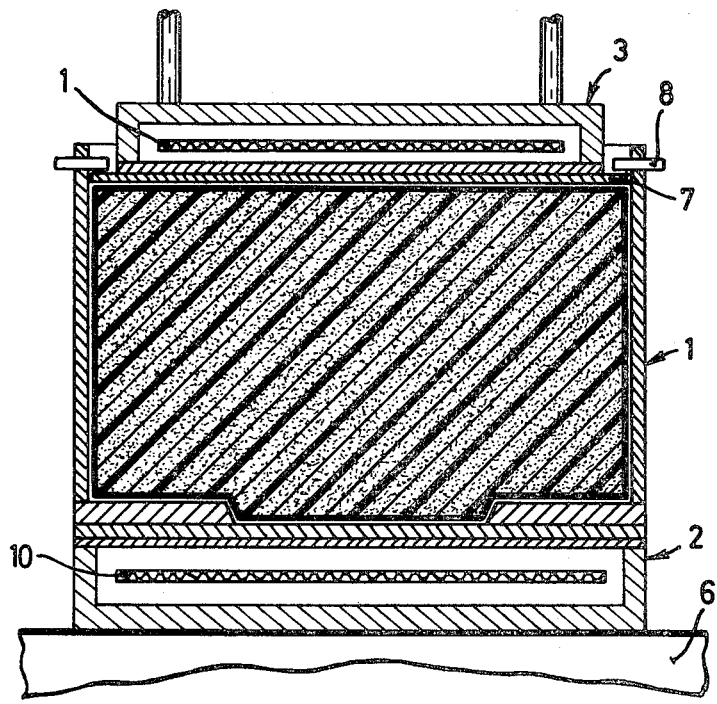

In a preferred embodiment, the apparatus used in the process of the invention is that shown, diagrammatically in FIGS. 2 to 4. This apparatus differs essentially from that desired above only in that the side walls 1 are rigidly attached to a base provided with a depression which is almost completely filled with the mixture of ethylene polymer, expanding agent and peroxide. As may be seen from FIG. 2, the depression in the mold in a press is hermetically sealed by means of a metal plate 7 when said metal plate is forced against the base of the mold by the heatable press ram 3. The mold stands on a heatable baseplate 2 resting on the lower portion 6 of the press. At certain distances from the base of the mold stop pins 8 are provided to limit the height to which the metal plate 7 is to be raised by the expanding compositions. As illustrated diagrammatically in FIG. 4, the heatable press ram 3 can pass the stop pins 8, but not so the metal plate 7.

When the ethylene polymer containing an expanding agent and a cross-linking agent, is heated in the apparatus illustrated in FIG. 2 to a temperature between 160° and 220°C, an expansible melt is produced in the hermetically sealed depression of the mold, and this melt expands when the pressure in the mold is released to atmospheric pressure due to the press ram 3 being raised, and forces the metal plate 7 upward. The molten material first expands laterally and then upwardly to form an expanded article. Lateral expansion of the melt is effected by raising the press ram 3 to the predetermined level within a period ranging from a fraction of a second to 20 seconds, usually from 1 to 6 seconds. In general, the said melt expands vertically through a distance equal to from 5 to 20 times the height $h$ of the depression in the base of the mold.

After cooling to about 50° to 80°C, a very homogeneous foam having a closed cell structure of fine pore size and a density of from 25 to 150 g/l, preferably from 25 to 60 g/l can be removed from the mold. The density of the expanded material largely depends on the amount of added expanding agent. The process of the invention also enables foams of higher densities to be made if desired.

It is surprising that a dimensionally stable expanded material is obtained by opening the mold at a high temperature because the melt, on account of the high decomposition temperature of the expanding agent, is heated to temperatures at which such foams usually shrink. Since the ethylene polymers are expanded at higher temperatures than in conventional processes and since nearly all of the gas released by the expanding agent is dissolved in the expansible melt, only one operation is required in the process of the invention and, moreover, less expanding agent is required to produce foams of equal density.

A particular advantage of this process for the manufacture of expanded material is that the expanded material need not be cooled under pressure in the press. After foaming, the mold 1 may be immediately removed from the press. The hot press is then used for heating and foaming another charge of the mixture of ethylene polymer, expanding agent and cross-linking agent in another mold. If 20 to 30 molds are available, it is possible to produce expanded materials or foam articles in such shorter periods of time than in conventional processes. The residence time of the molds in the press is determined essentially by the rate at which the mixture to be foamed heats up.

If desired, reinforcement materials, such as wire netting, steel inserts and tubes may be incorporated into the expanded materials. It is also possible to place films or foils in the molds, which films, or, for example, metal foils adhere to the material after expansion and a firm bond is established between the foil and the foam. Moreover, the expanded articles may be subsequently coated. They may also be colored, printed, cut, drilled, glued, covered with other materials and sewn into fabrics.

The foams are highly flexible, resilient soft, rot-proof and resistant to chemicals and most solvents.

A very wide range of applications is opened up because of the said properties, and the well-known favorable properties of foamed materials can be fully exploited, for example by using them as insulating materials, for wall insulation, filling expansion joints, insulating water pipes, or for making sound-deadening partitions, exterior wall panels or buoyant devices of all kinds, such as life rafts. Packaging and padding materials are other applications where high energy absorption is desirable. The said expanded materials may also be used in automobile construction.

The invention is illustrated by the following Examples in which the parts are by weight.

EXAMPLE 1

A homogeneous mixture is prepared from 6,000 parts of polyethylene having a density of 0.918, a melt index of 1.2 and a crystalline melting point of 105°C, 24 parts of 1,3-bis-(t-butylper-oxyisopropyl)-benzene (decomposition temperature 150°C), 15 parts of stearic acid, 200 parts of azodicarbonamide (decomposition temperature 180°–200°C) and 100 parts of talcum on mixing rolls at 120°C and is withdrawn in the form of sheets approximately 2 mm in thickness. Three sheets are stacked on the base of a metal mold which is gastight when closed, as illustrated in the accompanying drawings. The mold is closed such that the distance of the bottom of the heated ram from the baseplate of the mold is 7 mm. The mold is then hermetically sealed. The mold is heated at 200°C for 10 minutes. The ram of the press is then raised suddenly so that the distance of the bottom of the ram from the baseplate is increased to 100 mm within 20 seconds, the mold now no longer being hermetically sealed. In this way the volume of the cavity of the mold is increased by a multiple. In this enlarged cavity there is spontaneously formed a foam having a very uniform and fine cellular structure and a density of 60 g/l. The mold is removed from the press and cooled by a stream of cold air for 10 minutes.

The resulting very homogeneous foam is suitable, for example, for use as shock-absorbing material, as a sealing material, as insulating material for containers, as upholstery padding and as a material for filling expansion joints in buildings.

EXAMPLE 2

A mixture is prepared from the following components on a two-roll mill at 120°C:

1,000 parts of chlorinated polyethylene having a softening point of 85°C and an average molecular weight of 35,000 and containing 25% by weight of chlorine (obtained by the action of gaseous chlorine on particulate high-pressure polyethylene), 5 parts of 1,3-bit-(t-butylperoxyisopropyl)- benzene (decomposes at 150°C), 100 parts of N,N'-dinitroso-N,N'-dimethyl terephthalamide and 25 parts of stearic acid. The homogeneous mixture is withdrawn in the form of a sheet 5 mm in thickness.

Two such sheets are stacked on the base of a mold of the kind illustrated. The heatable ram of the press is then lowered to a distance of about 1 mm from the sheets so that it is about 11 mm from the baseplate. The mold is then heated at 190°C for 12 minutes by means of the heating elements in the baseplate 2 and the ram 3. During heating, the mold is closed to give a gastight seal. After the period of 12 minutes has elapsed, the ram is raised to a distance of 80 mm from the baseplate within 5 seconds and the cavity of the mold is thus enlarged considerably. When the ram 3 is raised, the hermetic seal is immediately broken. The expansible melt in the mold then expands into the enlarged cavity of the mold to form the desired foamed material. The heated ram is then withdrawn from the mold completely and the mold is removed from the press and left to cool in the air. After 20 minutes it is possible to remove the expanded material which has a very fine and uniform cellular structure. Its density is 40 g/l. It is flexible and extinguishes upon removal of a flame. The foam is highly suitable for use in buoyant devices, such as life-belts or for filling buoys.

EXAMPLE 3

A homogeneous mixture which is granulated as it leaved the die in the form of a strand is prepared from the following components in an extruder at 110°C:

3,000 parts of a copolymer of 88% of ethylene and 12% of vinyl acetate, 15 parts of dicumyl peroxide (decomposition temperature 160°C), 15 parts of stearic acid, 450 parts of p-carbomethoxy N-nitroso-N-methyl benzamide (decomposition temperature from 180° to 200°C), 50 parts of talcum and 150 parts of benzylbutyl phthalate.

There are thus obtained non-cross-linked expansible particles 5 mm in diameter. 150 g of the granular material is placed in a mold, which is gastight when closed and has two movable walls arranged opposite each other, in such a way that the cavity of the mold is completely filled with the particles to a depth of 6 mm. The mold is heated at 195°C for 8 minutes. The two movable walls are then moved apart in the course of 5 seconds such that the volume of the mold cavity is enlarged 18 times and the hermetic seal is broken. A foam is formed by expansion of the melt into the enlarged mold cavity. The mold is air-cooled.

The resulting foam has a density of 50 g/l and is characterized by very high flexibility and high energy absorption when subjected to impact or pressure. It can be used as insulating material in buildings and as damping pads for machines and the like.

EXAMPLE 4

Sheets having a thickness of from 2 to 3 mm are prepared on mixing rolls at 115°C from 1,500 parts of polyethylene having a density of 0.918 g/cm$^3$, a melt index of 1.2 and a crystalline melting point of 105°C, 400 parts of polyisobutylene having a molecular weight of 100,000, 7.5 parts of 1,3-bis (t-butylperoxyisopropyl)-benzene, 15 parts of zinc stearate and 190 parts of azo dicarbonamide.

On the baseplate 2 there is placed a plate measuring 200 × 200× 10 mm and having a cavity in its center measuring 100 × 100 × 10 mm. This arrangement approximately corresponds to that illustrated in FIG. 3 where $a$ is equal to 100 mm. Three steets having an area of 100 × 100 mm are placed in the cavity of the plate such that the cavity is almost completely filled. The weight of the sheets is 130 g. A box-shaped centerpiece measuring 192 × 192 × 70 mm is then placed on the baseplate 2. The ram of a heatable press fits into the said center-piece such that the cavity in the said plate is hermetically closed.

The sheets are then heated at 200°C for 6 minutes. The ram is then raised to a height of 5.5 cm above the baseplate in the course of 3 seconds. The expansible melt expands laterally and upwardly into the cavity thus formed. After 5 minutes, the ram is withdrawn from the center-piece 1 and the plate and center-piece 1 are removed from the press and allowed to cool in air at room temperature for 30 minutes. An expanded article measuring 20 × 20 × 5.5 cm is then removed from the mold. The foam has a density of 59 g/l and a very fine cellular structure. It is suitable, for example, for use as sealing material for bottle closures.

The expanded material may be cut into very thin homogeneous sheets which have a wide variety of uses, e.g., as shoe socks or linings for shoe uppers, when sandwiched between other materials, such as fabrics.

EXAMPLE 5

In a kneader mixer there are homogenized at 118°C 7,500 parts of polyethylene having a density of 0.917 g/cm$^3$, a melt index of 2.5 and a crystalline melting point of 103°C, 7,500 parts of a copolymer of 80% by weight of ethylene and 20% by weight of vinyl acetate, 150 parts of zinc stearate, 50 parts of stearic acid, 75 parts of 1,3-bis-(t-butylperoxyisopropyl)-benzene and 1,500 parts of azodicarbonamide. The resulting blend is then transferred while still warm to an extruder where it is passed through a slot die to form sheeting having a thickness of 3 mm.

In a square mold as illustrated in FIG. 3, in which A = 500 mm, $a$ = 300 mm and $h$ = 10 mm, a cavity measuring 300 × 300 × 10 mm is almost completely filled with sheets of said blend. The weight of the sheets is 1,000 g. The height H of the mold is 17 cm. The heated ram 3 of a press is introduced into the mold until the cavity in the base, which is filled with the sheets, is hermetically closed. The blend is then heated at 180°C for 8 minutes. The ram 3 is then moved 5.5 cm away from the baseplate in the course of 2 seconds and held in that position for 10 minutes. The expansible melt expands laterally and upwardly to completely fill the thus enlarged cavity of the mold. After withdrawal of the ram from the mold, the mold is cooled to room temperature. After 15 minutes, there is obtained a foam article measuring 500 × 500 × 55 mm and having a very uniform appearance and a very fine cellular structure. The density of the foam is 51 g/l. The expanded material is outstandingly suitable as shock-absorbent packaging material and for all insulating purposes where flexibility and resilience are desirable.

EXAMPLE 6

Sheets having a thickness of 5 mm are prepared by mixing the following ingredients on mixing rolls at 120°C: 500 parts of polyethylene having a density of 0.918 g/cm$^3$, a melt index of 1.2 and a crystalline melting point of 105°C, 500 parts of a copolymer of 85% by weight of ethylene and 15% by weight of vinyl acetate, 5 parts of 1,3-bis-(t-butylperoxyisopropyl)-benzene, 20 parts of zinc stearate and 120 parts of azodicarbonamide.

The depression in the base of a square mold as illustrated in FIG. 3 in which A = 500 mm, $a$ = 300 mm and $h$ = 15 mm is filled with piece of the sheets. The mold is then heated in the press for 8 minutes at 190°C and a pressure of 100 kg/cm$^2$. The ram is then raised 5 cm within 3 seconds so that the expansible composition can fill the cavity thus formed. 20 seconds after raising the ram 3 5 cm, the latter is raised a further 2.5 cm. The foam then expands vertically until the metal plate above the foam comes to bear against the stop pins 8 (FIG. 4). The mold is then removed from the press and cooled. There is obtained a homogeneous foam having a density of 45 g/l.

A foam article made in the same way but cooled in the mold for only 15 minutes instead of 25 minutes and then removed from the mold expands upon removal from the mold and thus has a specific weight of 40 g/l. The foam material is cut up into boards having a thickness of 10 mm by means of a band knife; such sheets are outstandingly suitable for use as sealing material for filling expansion joints in building and civil engineering applications.

We claim:

1. A process for the production of flexible foams from olefin polymers which comprises heating a preformed change formed from a mixture of (1.) an olefin polymer having an X-ray crystallinity of more than 25% at 25°C and selected from the group consisting of homopolymers of ethylene, propylene and butylene, copolymers of said monomers and copolymers of ethylene with 5 to 30% by weight of esters of acrylic acid or methacrylic acid and alcohols containing from one to 8 carbon atoms, copolymers of ethylene with from 5 to 30% by weight of vinyl carboxylic esters of carboxylic acids containing from two to four carbon atoms, copolymers of ethylene obtained by copolymerizing ethylene with t-butyl or isopropyl esters of acrylic or methacrylic acid which contain 0.1 to 7 mole% of polymerized units of carboxylic acid groups and chlorinated ethylene polymers containing 15 to 45% by weight of chlorine, (2.) a peroxide and (3.) a solid expanding agent having a decomposition temperature above the decomposition temperature of the peroxide in a mold which is gastight when closed and is filled with a volume of said preformed charge which is equal to from 95% to 100% of the capacity of the mold to a temperature above the softening point of the said olefin polymer and also above the decomposition temperatures of said peroxide and expanding agent to form a melt and whereby substantially all of the gas from said expanding agent is dissolved in the melt, cross-linking of the olefin polymer occurs and pressure is built up in the mold due to the release of the gas from the solid expansion agent reducing the pressure in the mold to atmospheric pressure, immediately increasing the volume of the mold cavity to from 3 to 35 times the volume of the expansible melt within from 0.1 to 20 seconds and cooling the expanded molding.

2. A process as claimed in claim 1 wherein a blend of an olefin polymer, a peroxide and an expanding agent is heated at temperatures ranging from 160° to 220°C.

3. A process as claimed in claim 1 wherein the peroxide is dicumyl peroxide.

4. A process as claimed in claim 1 wherein the peroxide is 1,3-bis-(t-butylperoxyisopropyl)-benzene.

5. A process as claimed in claim 1 wherein said olefin polymer is polyethylene.

* * * * *